United States Patent [19]

Naudin

[11] Patent Number: 4,697,679
[45] Date of Patent: Oct. 6, 1987

[54] CLUTCH COVER ASSEMBLY
[75] Inventor: Jacky Naudin, Asnieres, France
[73] Assignee: Valeo, Paris, France
[21] Appl. No.: 719,526
[22] Filed: Apr. 3, 1985
[30] Foreign Application Priority Data Apr. 4, 1984 [FR] France ............... 84 05291

[51] Int. Cl.[4] ........................................... F16D 13/71
[52] U.S. Cl. ........................... 192/70.18; 192/109 R
[58] Field of Search ............... 192/70.18, 89 B, 109 R

[56] References Cited

U.S. PATENT DOCUMENTS

| 2,248,378 | 7/1941 | Nutt | 192/70.18 |
|---|---|---|---|
| 3,130,828 | 4/1964 | Maurice | 192/66 |
| 3,489,256 | 1/1970 | Binder et al. | 192/70.18 X |
| 4,122,929 | 10/1978 | Maucher et al. | 192/70.18 |
| 4,417,651 | 11/1983 | Lu | 192/89 B |
| 4,423,804 | 1/1984 | Kettel et al. | 192/109 R |
| 4,558,771 | 12/1985 | Després | 192/70.18 |
| 4,607,738 | 8/1986 | Muller | 192/109 R |

FOREIGN PATENT DOCUMENTS

| 2607925 | 9/1977 | Fed. Rep. of Germany ... 192/70.18 |
|---|---|---|
| 867177 | 10/1941 | France . |
| 1537125 | 8/1968 | France . |
| 2342427 | 9/1977 | France . |
| 2463874 | 2/1981 | France . |
| 2528925 | 12/1983 | France . |
| 2554885 | 5/1985 | France . |
| 2032017 | 4/1980 | United Kingdom ............ 192/109 R |
| 2055997 | 3/1981 | United Kingdom ............ 192/70.18 |
| 2079875 | 1/1982 | United Kingdom ............ 192/70.18 |
| 2148415 | 5/1985 | United Kingdom . |

Primary Examiner—Leslie Braun
Assistant Examiner—Richard M. Lorence
Attorney, Agent, or Firm—Charles E. Brown; Charles A. Brown

[57] ABSTRACT

A clutch cover assembly for automobiles comprises an annular cover to be attached to a flywheel. An annular pressure plate coupled to the cover by coupling means permitting axial movement of the pressure plate relative to the cover. Axially acting elastic means urge the pressure plate from the cover. Abutment means retain the pressure plate axially after predetermined axial displacement relative to the cover. The cover comprises a transverse front wall on which the axially acting elastic means bear and an axial skirt. A transverse radial rim at the end of the skirt opposite the front wall bears on the flywheel. The pressure plate comprises radially projecting lugs on its outside periphery and the radial rim comprises louvers offset axially from its main part and formed with fixing lands. The coupling means comprise deformable tangs attached at one end to the lugs on the pressure plate and at the other end to the fixing land on the louvers. The skirt comprises a notch which extends into and interrupts the radial rim. Each lug on the pressure plate passes radially through this notch. The deformable tang associated with each lug is formed on the outside of the cover, on the side of its radial rim facing its front wall, extending from this lug to the corresponding fixing land on the corresponding louver. Each louver comprises an intermediate land axially offset from the fixing land in the direction towards the main part of the radial rim.

19 Claims, 5 Drawing Figures

CLUTCH COVER ASSEMBLY

BACKGROUND OF THE INVENTION

The present invention is generally concerned with clutches, in particular for automobile vehicles, and is more particularly directed towards the part of such clutches commonly referred to as the clutch cover assembly which, itself forming a unit assembly, is adapted to be attached to a plate, called the reaction plate or flywheel, following insertion of a friction disk, in order to make up a clutch of this kind.

DESCRIPTION OF THE PRIOR ART

Generally speaking, a clutch cover assembly of this kind comprises a first generally annular member called the cover through the intermediary of which it is adapted to be attached to the reaction plate with which it is to be associated, a second generally annular member called the pressure plate which is rotationally coupled to the cover by coupling means permitting axial displacement of said pressure plate relative to said cover and, between the cover and the pressure plate, axially acting elastic means, diaphragm spring or springs, which bear on the cover and are operative axially on the pressure plate in the direction in which said pressure plate moves away from said cover, for the purpose of clamping the friction disk between this pressure plate and the reaction plate when the assembly is actually attached to a reaction plate of this kind.

Generally speaking, the cover comprises a generally transverse front wall, or bottom, adapted to have the axially acting elastic means bear on it, a generally axial side wall, or skirt, and a generally transverse radial rim at the end of said side wall opposite said front wall adapted to bear on the pressure plate. The radial rim features localized louvers or bridges defining a succession of lands offset axially relative to its main part, at spaced locations and associated with radially projecting lugs on the outside periphery of the pressure plate. The coupling means connecting the pressure plate to the cover comprise elastically deformable tangs which are disposed generally transversely and individually or in groups fastened at one end to a lug of the pressure plate and at the other end to a land on a louver of the radial rim of the cover, hereinafter referred to for convenience as a fixing land.

This is the case, for example, in the clutch cover assembly which is the subject of French patent application No. 77 05555 filed Feb. 25, 1977 and published under the No. 2.342.427, in which the louvers which the radial rim of the cover forms locally have sufficient axial amplitude to form of themselves a passage through which the lugs on the pressure plate can pass radially and providing for the disposition of the corresponding elastically deformable tangs, the latter then extending away from the side of the radial rim of the cover opposite its front wall.

Generally speaking, in clutch cover assemblies it is desirable to limit the axial displacement of the pressure plate when acted on by the axially acting elastic means.

This is the case, in particular, when a clutch cover assembly of this kind is stored prior to mounting it on a reaction plate since, failing this, that is to say if the pressure plate (axial displacement of which is not then delimited by a reaction plate of this kind through the intermediary of a friction disk) is not subject to any limitation of its axial displacement relative to the cover, there may result latent deterioration of the elastically deformable tangs constituting the coupling means coupling the pressure plate to the cover, elastically deformable tangs of this kind having of themselves only moderate resistance in the axial direction to the thrust exerted by these elastic means.

This is why it is usual to associate with the pressure plate abutment means adapted to retain it in the axial direction after a predetermined axial displacement relative to the cover.

Of themselves, abutment means of this kind have been known for a considerable time, in particular from French Pat. No. 867,177 in which the rivets or screws attaching the elastically deformable tangs to the pressure plate have their head sufficiently extended in the axial direction to pass through the cover and feature, beyond the latter, a flange adapted to form the required abutment means.

However, although an arrangement of this kind requires a smaller number of parts, it has the disadvantage of employing fixing members which are relatively expensive by virtue of the necessary extension of their head.

In the aforementioned French patent application No. 77 05555 the elastically deformable tangs are adapted to constitute the required abutment means.

To this end, they extend cantilever fashion beyond their attachment to the lugs of the pressure plate in order to cooperate with a transverse shoulder provided in a complementary manner on the radial rim of the cover.

However, an arrangement of this kind necessitates consequent extension of the elastically deformable tangs and therefore rules out the use of standard elastically deformable tangs.

A general object of the present invention is to provide an arrangement enabling these disadvantages to be overcome and further conferring other advantages.

SUMMARY OF THE INVENTION

The present invention consists in a clutch cover assembly suitable for automobile vehicles comprising a first generally annular member called the cover through the intermediary of which it is adapted to be attached to a reaction plate or flywheel, a second generally annular member called the pressure plate, coupling means whereby said pressure plate is coupled to said cover adapted to permit axial movement of said pressure plate relative to said cover, axially acting elastic means bearing on said cover and operative on said pressure plate in the axial direction in which it moves away from said cover, and abutment means adapted to retain said pressure plate axially after predetermined axial displacement thereof relative to said cover, wherein said cover comprises a generally transverse front wall adapted to have said axially acting elastic means bear on it, a generally axial side wall and a generally transverse radial rim at the end of said side wall opposite said front wall adapted to bear on said reaction plate, said pressure plate comprises radially projecting lugs on its outside periphery and said radial rim comprises a succession of louvers offset axially relative to its main part and formed with respective fixing lands, said coupling means comprise elastically deformable tangs attached individually or in groups at one end to one of said lugs of said pressure plate and at the other end to the fixing land on one of said louvers of said radial rim of said cover, said side wall of said cover comprises a notch which extends into said radial rim thereof and constitutes a local interruption thereof, each lug on said pressure plate passes generally radially through said notch, the or each of said elastically deformable tangs associated with each of said lugs is formed on the outside of said cover, that is to say on the side of said radial rim thereof facing its front wall, and extends from said lug to the corresponding fixing land of the corresponding louver of said radial rim, and each of said louvers comprises an intermediate land axially offset relative to said fixing land in the direction towards the main part of said radial rim and constituting said abutment means.

In one specific embodiment, said intermediate land comprises a circumferential extension in the direction towards the corresponding lug of said pressure plate beyond the corresponding edge of the corresponding notch in said side wall of said cover and said radial rim.

Be this as it may, it is through its median area, between its fixing points, that the or each elastically deformable tang is called upon to cooperate abutment fashion with the radial rim of the cover, more precisely with the circumferential extension of one of the lands of the latter in the specific embodiment mentioned hereinabove, to secure the required axial retention of the pressure plate, and thus no extension of the elastically deformable tang or tangs is required for this purpose.

In other words, in accordance with the invention the elastically deformable tangs may advantageously and economically be standard elastically deformable tangs and the pressure plate may also advantageously and economically be a standard pressure plate.

The same may also apply, if required, to the fixing members attaching the elastically deformable tangs to the lugs on the pressure plate.

As an alternative to this, however, the head of a fixing member of this kind, through which it bears on the or each of the elastically deformable tangs concerned, may be of greater size in the transverse direction than the standard size, at least locally, so as to overlie, as seen in axial projection, when present, the extension of the intermediate land of the corresponding louver of the radial rim of the cover, for the purpose of bearing on the latter through the elastically deformable tang or tangs, which reduces the load on the latter.

Be this as it may, by virtue of the fact that in accordance with the invention the lugs of the pressure plate pass radially through the side wall of the cover through respective notches formed to this end in the latter, the louvers which are associated with them on the radial rim of said cover may advantageously be of limited axial amplitude, the passage which they form not necessarily having to be adapted according to the radial passage to be provided in this way for these lugs.

This is all the more the case in that the corresponding elastically deformable tangs, being themselves disposed, in accordance with the invention, outside the cover, on the side of the radial rim of the latter facing its front wall, may in service move unrestrictedly in the axial direction relative to this radial rim, within the required limits for axial displacement of the pressure plate, of course.

Thus in accordance with the invention that of the lands on a louver on the radial rim of the cover which is axially farthest away from the main part of said radial rim, that is to say its fixing land, is advantageously at most substantially halfway between said main part of said radial rim and the front wall of the cover.

In other words, the side wall or skirt of the cover extends axially, even in line with the louvers on the radial rim, over a relatively great axial length which, on the one hand, favors its rigidity and strength and, on the other hand, minimizes the rotating volume due to the projections which such louvers form relative to this side wall.

The installation of the assembly into a relatively congested environment may thus with advantage be simplified.

In French patent application No. 77 05555 the louvers which the radial rim of the cover forms locally are necessarily of relatively great axial extent, both because the passage which they form must be sufficient for a lug of the pressure plate to pass through and because, the corresponding elastically deformable tangs being disposed on the side of this radial rim opposite the front wall of the cover, it is necessary to provide for them sufficient capacity for axial displacement, which leads to further offsetting in the axial direction towards the front wall of the land on these louvers through which the fixing land is linked to the main part on the side of said lug of the pressure plate.

The disposition of the elastically deformable tangs on the outside of the cover is known per se, in particular form French patent application No. 79 20837 filed Aug. 17, 1979 and published under the No. 2.463.874.

However, here this arrangement is utilized in various assembly configurations without any influence on the conditions for implementation of the abutment means possibly provided for axial retention of the pressure plate.

In accordance with the invention, however, it does participate in such implementation.

Other objects and advantages will appear from the following description of examples of the invention, when considered in connection with the accompanying drawings, and the novel features will be particularly pointed out in the appended claims.

DESCRIPTION OF THE PREFERRED EMBODIMENTS

Figure 1:
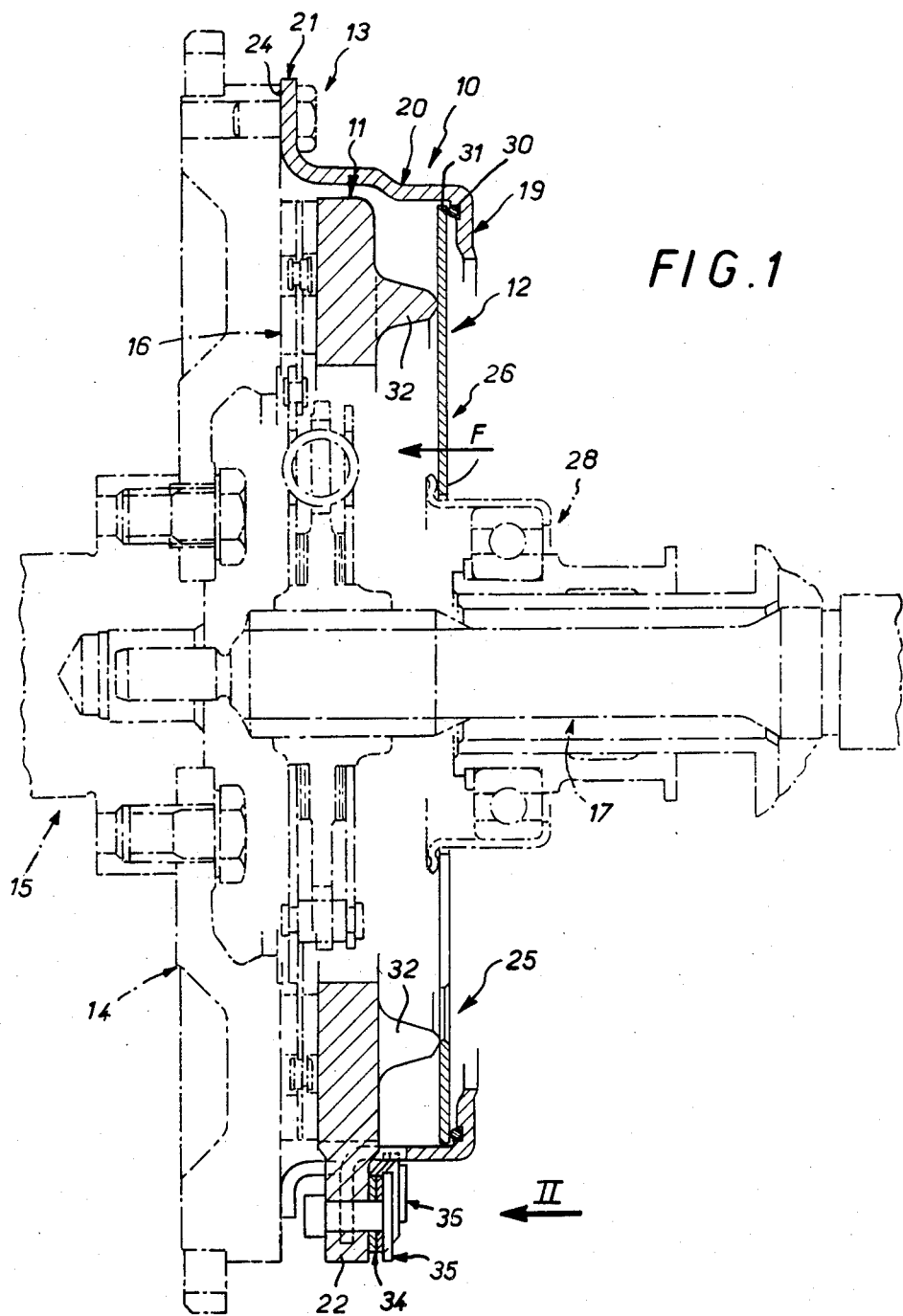
FIG. 1 is a view in axial cross-section on the line I—I in FIG. 2 of a clutch cover assembly in accordance with the invention.

Generally speaking, and as shown in these figures, a clutch cover assembly in accordance with the invention comprises a first generally annular member 10, called the cover, a second generally annular member 11, called the pressure plate, and, disposed between these, axially acting elastic means 12 which, bearing on the cover 10, are operative axially on the pressure plate 11 in the direction in which, as indicated by the arrow F in FIG. 1, said pressure plate 11 tends to move away from said cover 10.

Figure 2:
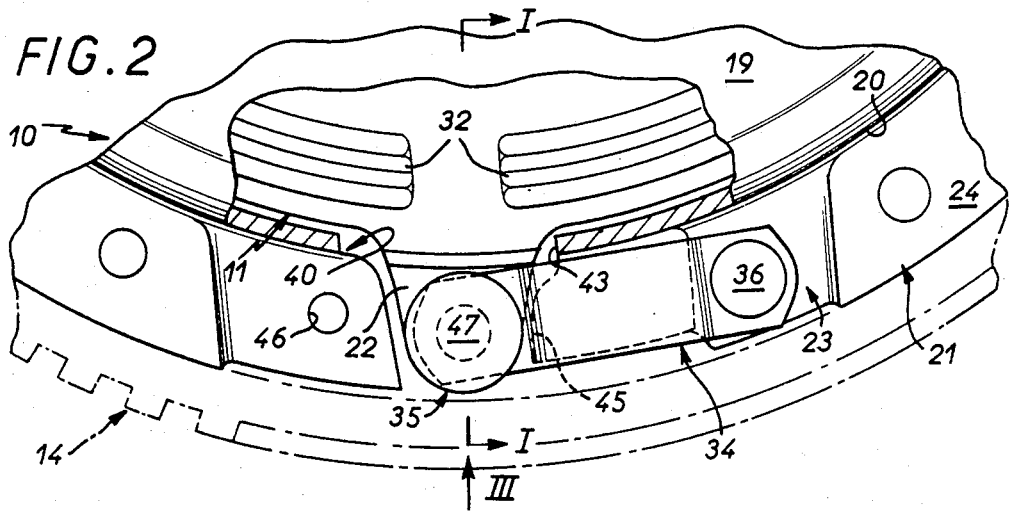
FIG. 2 is a locally cutaway partial view in elevation of this assembly as seen in the direction of the arrow II in FIG. 1.
Figure 3:
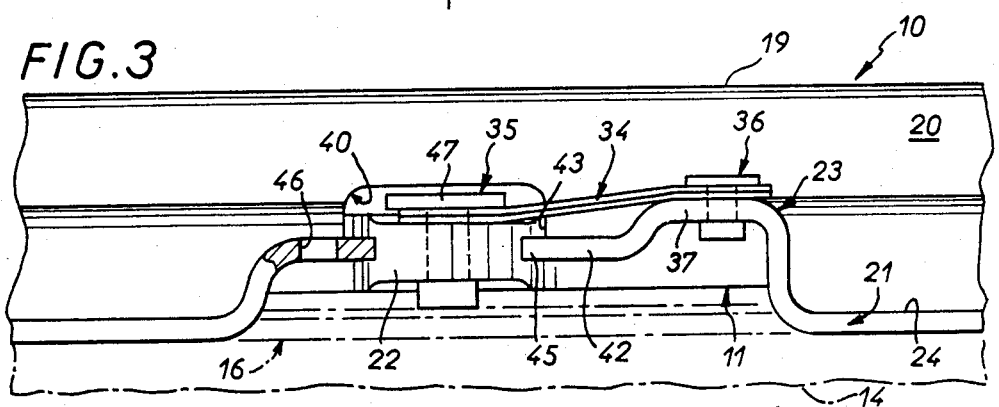
FIG. 3 is a partial side view of it in the direction of the arrow III in FIG. 2.

As shown schematically in chain-dotted line in FIGS. 1 through 3, this clutch cover assembly is designed to be attached by set screws 13 to a reaction plate 14, or flywheel, constrained to rotate with a first shaft 15, in practice a driving shaft, following insertion of a friction disk 16 constrained to rotate with a second shaft 17, in practice a driven shaft.

The cover 10 itself features a generally transverse front wall 19, or bottom, adapted to have the axially acting elastic means 12 bear on it, a generally axial side wall 20, or skirt, by means of which it defines a volume adapted to accommodate the pressure plate 11, the axially acting elastic means 12 and the friction disk 16, and a generally transverse radial rim 21 at the end of said side wall 20 opposite the front wall 19 directed radially away from the axis of the assembly and adapted to bear on the reaction plate 14.

In association with lugs 22 which the pressure plate 11 itself comprises, projecting radially from its outside periphery, the radial rim 21 of the cover 10 features a succession of localized louver or bridge areas 23, to be described in detail hereinafter, offset axially relative to its main part 24, said main part 24 being defined as that through which it is adapted to bear against the associated reaction plate 14.

In practice, three lugs 22 may be provided in this way projecting from the outside periphery of the pressure plate 11. The radial rim 21 of the cover 10 then forms three localized louvers 23 in corresponding relationship.

A single lug 22 and single louver 23 are visible in the figures.

In the embodiment shown in these figures, the axially acting elastic means 12 are formed by the peripheral part, forming a Belleville spring, of a third annular member 25 commonly called a diaphragm spring of which the central part 26 is subdivided into radial fingers by slots in order to constitute clutch release levers which, when acted on by a clutch release bearing 28 shown in chain-dotted line in FIG. 1, are adapted to disengage the assembly.

Through its peripheral part forming a Belleville spring 12, the diaphragm spring 25 bears on the cover 10, more precisely on the front wall 19 of the latter, through the intermediary of a ring 30 accommodated in a groove 31 in this front wall 19, and it bears on the pressure plate 11 which itself features to this end spaced axially projecting bosses 32. Since in the embodiment shown the clutch cover assembly is designed for the implementation of a clutch of the kind operated by traction, the clutch release bearing 28 operating in traction on the radial fingers which the central part 26 of the diaphragm spring 25 forms, on the side of the latter facing the reaction plate 14, the diameter of the circumference along which the peripheral part 12 forming the Belleville spring of this diaphragm spring 25 bears on the cover 10 is greater than that of the circumference along which it bears on the pressure plate 11.

The pressure plate 11 is rotationally coupled to said cover 10 and, through the intermediary of the latter, to the reaction plate 14 by coupling means to be described in detail hereinafter which permit it to move axially relative to the cover 10.

As shown, these coupling means comprise generally transverse elastically deformable tangs 34 fastened individually or in groups at one end, by a fixing member 35, to a lug 22 of the pressure plate 11 and, at the other end, by a fixing member 36, to a land 37 of the corresponding louver 23 of the radial rim 21 of the cover 10.

In the embodiment shown, the elastically deformable tangs 34 are employed in groups, each group comprising, superposed identically on one another, two elastically deformable tangs 34.

Also, in this embodiment, these elastically deformable tangs 34 all extend substantially tangentially to a common circumference of the assembly.

Finally, the clutch cover assembly in accordance with the invention comprises abutment means adapted to axially retain the pressure plate 11 after a predetermined axial displacement of the latter relative to the cover 10.

In accordance with the invention, and in combination, each lug 22 of the pressure plate 11 passes generally radially through a notch 40 formed in the side wall 20 of the cover 10 and extending into the radial rim 21 of the latter, so locally interrupting this radial rim 21, the elastically deformable tangs 34 associated with a lug 22 of this kind are disposed on the outside of the cover 10, that is to say on the side of the radial rim 21 of the latter facing its front wall 19, extending from a lug 22 of this kind to the land 37, hereinafter referred to for convenience as the fixing land, of the corresponding louver 23 of said radial rim 21 and, in order to constitute the abutment means provided for axially retaining the pressure plate 11, said louver 23 comprises a land 42, hereafter referred to for convenience as the intermediate land, offset axially relative to said fixing land 37 in the direction towards the main part 24 of said radial rim 21.

In the embodiment shown, on one at least of the louvers 23 formed by the radial rim 21 of the cover 10, this intermediate land 42 comprises a circumferential extension 45 in the direction towards the corresponding lug 22 of the pressure plate 11, beyond the corresponding edge 43 of the corresponding notch 40 in the side wall 20 of said cover 10 and said radial rim 21 of the latter.

In practice, a circumferential extension 45 of this kind is provided for the intermediate land 42 of each of the louvers 23 formed by the radial rim 21 of the cover 10.

In the embodiment shown, this circumferential extension 45 of the intermediate land 42 of a louver 23 extends as far as the vicinity of the corresponding lug 22 of the pressure plate 11, and this intermediate land 42 extends either side of the notch 40 locally interrupting the louver 23 featuring, on the side opposite said circumferential extension 45, a hole 46 adapted for fitting, if required, any form of balancing member, such as a rivet, for example, not shown in the figures.

Finally, in the embodiments shown the fixing members 35 and 36 for the elastically deformable tangs 34 are in practice both rivets.

In the embodiments specifically shown in FIGS. 1 through 4, these are standard type rivets and in particular, in the case of those constituting the fixing members 35, the head 47 of the rivets, through which they bear on the corresponding elastically deformable tangs 34, have the usual moderate transverse size so that, in this embodiment, the head 47 does not project beyond the overall contour of the underlying lug 22 of the pressure plate 11.

Finally, in the embodiments shown, the elastically deformable tangs 34 associated with each of the lugs 22 of the pressure plate 11 in practice extend away from the side of this lug facing the front wall 19 of the cover 10.

Figure 4:
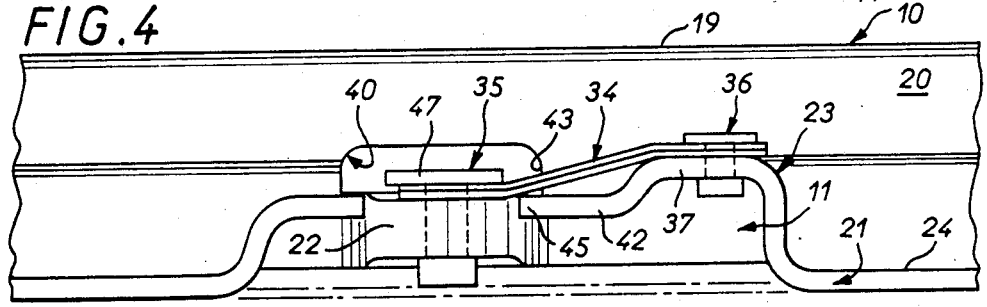
FIG. 4 is a view analogous to that of FIG. 3 showing the intervention of the abutment means provided for axial retention of the pressure plate in this clutch cover assembly.

When the clutch cover assembly in accordance with the invention is isolated, as when in storage, for example, the elastically deformable tangs 34 associated with the lugs 22 of the pressure plate 11 bear through their median area, that is to say between their fixing members 35 and 36, on the circumferential extension 45 of the intermediate land 42 of the louver 23 in the radial rim 21 of the cover 10 which ensures, abutment fashion, the required axial retention of the pressure plate 11 relative to the cover 10, as shown in FIG. 4.

In service, that is to say with the clutch cover assembly in place on the reaction plate 14, as shown in FIGS. 1 through 3, the pressure plate 11 is axially urged in the direction towards the front wall 19 of the cover 10 and the elastically deformable tangs 34 associated with these lugs 22 then remain at a distance from the circumferential extension 45 of the intermediate land 42 of the corresponding louver 23 of the radial rim 21 of the cover 10.

As will be noted, a louver of this kind is in practice formed by only two lands axially offset relative to one another, namely the fixing land 37 and the intermediate land 42.

Preferably that of the lands on a louver 23 of this kind which is axially farthest away from the main part 24 of the radial rim 21 of which it forms part, namely the fixing land 37, is at most substantially halfway between said main part 24 and the front wall 19 of the cover 10.

In other words, each louver 23 extends at most half the height of the side wall 20 of the cover 10 in which it is formed.

Figure 5:
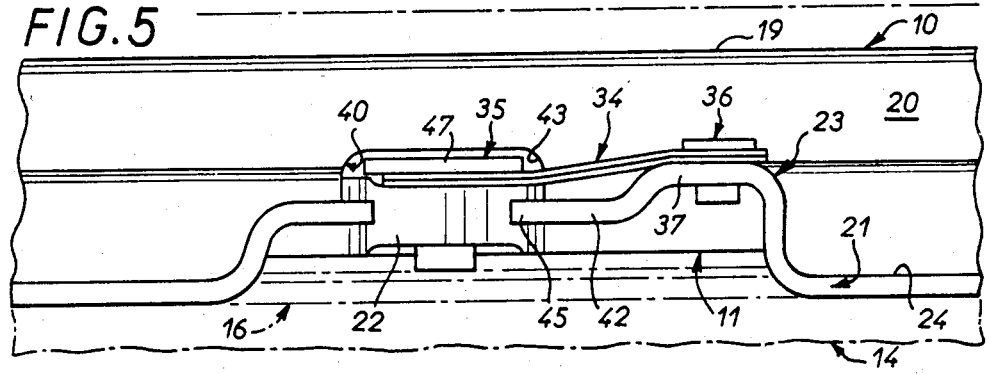
FIG. 5 is a view also analogous to that of FIG. 3 relating to an alternative embodiment.

In the embodiment shown in FIG. 5, the head 47 of the rivet constituting the fixing member 35 by which the elastically deformable tangs 34 associated with a lug 22 of the pressure plate 11 are fastened to this lug 22 is at least locally of sufficient transverse size to overlie, as seen in axial projection, the circumferential extension 45 of the intermediate land 42 of the corresponding louver 23 of the radial rim 21 of the cover 10.

In other words, the head 47 of this rivet has a diameter larger than previously and sufficient in all cases for the head to project beyond the contour of the underlying lug 22 of the pressure plate 11 and so to locally overlie the circumferential extension 45 of the associated intermediate land 42.

It will be understood that various changes in the details, materials and arrangements of parts which have been herein described and illustrated in order to explain the nature of the invention may be made by those skilled in the art within the principle and scope of the invention as expressed in the appended claims.

For example, instead of a diaphragm spring the axially acting elastic means employed may consist of helical springs, as in the aforementioned French Pat. No. 867.177.

Furthermore, applications of the invention are not limited to clutches commanded in traction, but extend equally well to clutches commanded in thrust which, in the case where the axially acting elastic means are implemented as a diaphragm spring, corresponds to an implementation in which the diameter of the circumference along which the peripheral part of the diaphragm spring bears on the cover is less than that of the circumference along which it bears on the pressure plate.

There is claimed:

1. Clutch cover assembly suitable for automobile vehicles, comprising a generally annular cover adapted to be attached to a reaction plate, a generally annular pressure plate, rotational coupling means coupling said pressure plate to said cover for rotation while permitting axial movement of said pressure plate relative to said cover, axially acting elastic means bearing on said cover and urging said pressure plate away from said cover, and abutment means adapted to retain said pressure plate axially at a predetermined axial distance from said cover, said cover comprising a generally transverse front wall against which said axially acting elastic means bears, a generally axial side wall and a generally transverse radial rim at the end of said side wall axially remote from said front wall adapted to bear on the reaction plate, said pressure plate further comprising radially projecting lugs on its outside periphery, and said cover radial rim having a plurality of circumferentially spaced louvers offset axially relative to a main part of said radial rim, said louvers having respective fixing lands, said coupling means comprising elastically deformable straps attached at one end to one of said lugs of said pressure plate and, at an other end to a respective fixing land on a corresponding one of said louvers of said radial rim of said cover, said side wall of said cover having notches extending therethrough and locally interrupting respective louvers of said radial rim, said lugs on said pressure plate passing generally radially through said notches, each of said elastically deformable straps being disposed externally of said cover and on one side of said louvers axially facing said transverse front wall, and said louvers having circumferentially intermediate lands axially offset relative to respective fixing lands in the direction towards the main part of said radial rim and defining said abutment means.

2. Clutch cover assembly according to claim 1, wherein said intermediate land of at least one of said louvers comprises a circumferential extension in the direction towards an associated one of said lugs of said pressure plate circumferentially beyond an adjacent axial edge of the notch in said side wall of said cover through which the associated one of said lugs extends.

3. Clutch cover assembly according to claim 2, wherein said circumferential extension extends proximate to the associated one of said lugs of said pressure plate.

4. Clutch cover assembly according to claim 2, wherein said elastically deformable straps are attached to said lugs on said pressure plate on the side of said lugs axially facing said front wall of said cover.

5. Clutch cover assembly according to claim 4, wherein respective fixing members attach said elastically deformable straps to associated ones of said lugs, and have heads bearing on the respective straps and being of sufficient size in the transverse direction to at least partially circumferentially overlie a circumferential extension of the intermediate land of the respective louvers of said radial rim of said cover.

6. Clutch cover assembly according to claim 2, wherein said intermediate land of said louvers have portions disposed circumferentially on the other side of the notches relative to associated fixing lands, said portions having holes for receiving balance members.

7. Clutch cover assembly according to claim 1, wherein said fixing lands are substantially midway between said main part of said radial rim and said front wall of said cover.

8. Clutch cover assembly suitable for automobile vehicles comprising a cover adapted to be attached to a reaction plate, a pressure plate, elastically deformable straps rotationally coupling said pressure plate rotationally to said cover while permitting axial movement of said pressure plate relative to said cover, axially acting elastic means bearing on a generally transverse front wall of said cover and urging said presure plate axially away from said transverse front wall, said cover further comprising a generally axial sidewall defining a space adapted to accommodate said pressure plate, and a generally transverse radial rim axially remote from said transverse front wall, said pressure plate having radially projecting lugs extending through said sidewall, said radial rim having circumferentially spaced localized louver-like lands offset axially towards said front wall of said cover relative to a main part of said radial rim, said elastically deformable straps being attached at one end to respective ones of lugs on said pressure plate and at an other end to respective ones of said fixing lands of said louver-like lands on said radial rim of said cover, and said louver-like lands of said radial rim of said cover being adapted to cooperate in abutment fashion with circumferentially intermediate areas of said elastically deformable straps for defining a storage position of said cover assembly.

9. Clutch cover assembly according to claim 8, wherein said elastically deformable straps are on a side of said louver-like lands of said cover axially facing said front wall of said cover.

10. Clutch cover assembly according to claim 8, wherein a plurality of notches are formed in sidewall of said cover in alignment with said louver-like lands therethrough and said lugs of said pressure plate pass generally radially through respective notches.

11. Clutch cover assembly according to claim 8, wherein each of said louver-like lands comprises an intermediate land axially offset relative to a respective one of said fixing land towards said main part of said radial rim and said intermediate areas of said straps being cooperable with respective intermediate lands.

12. Clutch cover assembly according to claim 11, wherein said intermediate land of at least one of said louvers comprises a circumferential extension in the direction towards an associated one of said lugs of said pressure plate circumferentially beyond an adjacent axial edge of the notch in said side wall of said cover through which the associated one of said lugs extends.

13. Clutch cover assembly according to claim 12, wherein said circumferential extension extends proximate to the associated one of said lugs of said pressure plate.

14. Clutch cover assembly according to claim 11, wherein said elastically deformable straps are attached to said lugs on said pressure plate on the side of said lugs axially facing said front wall of said cover.

15. Clutch cover assembly according to claim 14, wherein respective fixing members attach said elastically deformable straps to associated ones of said lugs, and have heads bearing on the respective straps and being of sufficient size in a transverse direction to at least partially circumferentially overlie and said circumferential extension of the intermediate land of the respective louvers of said radial rim of said cover.

16. Clutch cover assembly according to claim 11, wherein said intermediate land of said louvers have portions disposed circumferentially on the other side of the notches relative to associated fixing lands, said portions having holes for receiving balance members.

17. Clutch cover assembly according to claim 11, wherein said fixing lands are substantially midway between said main part of said radial rim and said front wall of said cover.

18. Clutch cover assembly suitable for automobile vehicles, comprising a generally annular cover adapted to be attached to a reaction plate, a generally annular pressure plate, rotational coupling means coupling said pressure plate to said cover for rotation while permitting axial movement of said pressure plate relative to said cover, axially acting elastic means bearing on said cover and urging said pressure plate away from said cover, abutment means adapted to retain said pressure plate axially at a predetermined axial distance from said cover, said cover comprising a generally transverse front wall against which said axially acting elastic means bears, a generally axial side wall and a generally transverse radial rim at an end of said side wall axially remote from said front wall adapted to bear on the reaction plate, said pressure plate further comprising radially projecting lugs on its outside periphery, and said cover radial rim having discrete fixing lands offset axially towards said front wall of said cover relative to a main part of said radial rim, fixing members fixing said elastically deformable straps at one end to respective ones of said lugs of said pressure plate and at an other end to respective ones of said fixing lands, said elastically deformable straps being adapted to abut corresponding circumferential extensions of said radial rim of said cover to define a storage position of said pressure plate, said fixing members having heads of sufficient large transverse dimension to partially circumferentially overlie respective circumferential extensions of said radial rim.

19. Clutch cover assembly according to claim 18, wherein said elastically deformable straps are arranged on a side of said radial rim of said cover facing axially towards said front wall of said cover.

* * * * *